United States Patent [19]

Watanabe et al.

[11] Patent Number: 5,537,978
[45] Date of Patent: Jul. 23, 1996

[54] APPARATUS AND METHOD FOR DETERMINING CHARACTERISTIC OF FUEL SUPPLIED TO VEHICULAR INTERNAL COMBUSTION ENGINE

[75] Inventors: Satoru Watanabe; Naoki Tomisawa, both of Atsugi, Japan

[73] Assignee: Unisia Jecs Corporation, Atsugi, Japan

[21] Appl. No.: 418,108

[22] Filed: Apr. 6, 1995

[30]        Foreign Application Priority Data

Apr. 7, 1994  [JP]  Japan ................................. 6-069646

[51] Int. Cl.$^6$ ............................. F02D 45/00; F02D 19/08
[52] U.S. Cl. ......................... 123/435; 73/35.02; 123/494
[58] Field of Search ................................. 123/1 A, 435, 123/491, 494; 73/35.02, 116, 117.3

[56]               References Cited

U.S. PATENT DOCUMENTS 4,660,535  4/1987  Asano ................................. 123/425
4,942,848  7/1990  Terasaka .......................... 123/491 X
5,363,314  11/1994 Kobayashi et al. ..................... 364/497
5,419,296  5/1995  Yamaura ............................... 123/435

FOREIGN PATENT DOCUMENTS

3-271541  12/1991  Japan .

*Primary Examiner*—Tony M. Argenbright
*Attorney, Agent, or Firm*—Foley & Lardner

[57]                ABSTRACT

An apparatus and method for determining a characteristic of a fuel actually used in a vehicular internal combustion engine. The characteristic of the fuel actually used in the engine is determined on the basis of a fuel supply quantity ($\Sigma Ti$) to the engine during an engine start until an initial stage of an explosion of an air-fuel mixture in any one of engine cylinders and a time duration measured by a timer (Tr) from a time at which the initial explosion has occurred to a time at which a completion of the explosion has occurred.

17 Claims, 4 Drawing Sheets

APPARATUS AND METHOD FOR DETERMINING CHARACTERISTIC OF FUEL SUPPLIED TO VEHICULAR INTERNAL COMBUSTION ENGINE

BACKGROUND OF THE INVENTION

The present invention relates to an apparatus and method for determining a characteristic of fuel (heavier gravity or lighter gravity fuel) supplied to a vehicular internal combustion engine.

U.S. patent application Ser. Nos. 08/041,588, now U.S. Pat. No. 5,363,314 issued on Nov. 8, 1994, No. 08/177,099 filed on Jan. 3, 1994, now U.S. Pat. No. 5,419,296, No. 08/325,665 filed on Oct. 19, 1994, and No. 08/408,007 filed on Mar. 22, 1995, exemplify previously proposed fuel characteristic determining apparatuses.

A Japanese Patent Application First Publication No. Heisei 3-271541 published on Dec. 3, 1991 exemplifies another previously proposed fuel characteristic determining apparatus.

In this Japanese Patent Application First Publication, a heavy or light gravity (quality) characteristic sensor for a fuel supplied to a vehicular internal combustion engine is provided in order to correct a fuel injection quantity supplied to the engine, i.e., ratio of an air-fuel mixture to be supplied to the engine. The fuel characteristic sensor includes a pair of electrodes installed in a fuel passage of the engine so that according to a variation in resistance in the fuel characteristic sensor between the pair of electrodes, the fuel characteristic, i.e., the heavier gravity fuel or lighter gravity fuel is detected. The heavier or lighter gravity is related to, specifically, a vaporization ability (vaporizability, vaporization percentage) that the fuel has. However, since, in the other previously proposed fuel supply quantity controlling apparatus disclosed in the latter Japanese Patent Application First Publication, the exclusively used (self-contained) fuel characteristic sensor is provided so that a whole system of controlling the air-fuel mixture ratio becomes expensive and a possibility of resulting in an erroneous determination of fuel characteristic becomes high due to a blending of an additive(s) in the fuel.

SUMMARY OF THE INVENTION

It is an object of the present invention to provide an apparatus and method for determining a characteristic of fuel actually supplied to a vehicular internal combustion engine which can accurately determine the characteristic of the fuel supplied to the engine at an earlier time of an engine driving than ever without use of an exclusively arranged fuel characteristic sensor.

The above-described object can be achieved by providing an apparatus for determining a fuel characteristic supplied to a vehicular internal combustion engine, comprising: a) first determining means for determining whether it is a time for the engine to start; b) initial explosion determining means for determining whether an initial explosion of the fuel supplied to any one of engine cylinders occurs; c) complete explosion determining means for determining whether a complete explosion of the fuel supplied to any one of the engine cylinder occurs; d) fuel supply quantity calculating means for calculating a fuel supply quantity during a time duration from a time at which the first determining means determines that it is the time for the engine to start to a time at which the initial explosion determining means determines that the initial explosion occurs; and e) time measuring means for measuring a time duration from a time at which the initial explosion determining means determines that the initial explosion has occurred to a time at which the complete explosion determining means determines that the complete explosion has occurred; and f) second determining means for determining the fuel characteristic supplied to the engine on the basis of both of the calculated fuel quantity by means of the fuel supply quantity calculating means and the time duration measured by said time measuring means.

The above-described object can also be achieved by providing a method for determining a fuel characteristic supplied to a vehicular internal combustion engine, comprising the steps of: a) determining whether it is a time for the engine to start;

b) determining whether an initial explosion of the fuel supplied to any one of engine cylinders occurs; c) determining whether a complete explosion of the fuel supplied to any one of the engine cylinder occurs; d) calculating a fuel supply quantity during a time duration from a time at which the time for the engine to start is determined at the step a) to a time at which the initial explosion occurs at the step b); and e) measuring a time duration from a time at which the occurrence in the initial explosion is determined to a time at which the occurrence in complete explosion is determined; and f) determining the fuel characteristic supplied to the engine on the basis of both of the calculated fuel quantity at the step d) and the time duration measured at the step e).

BEST MODE CARRYING OUT THE INVENTION

Reference will hereinafter be made to the drawings in order to facilitate a better understanding of the present invention.

Figure 1:
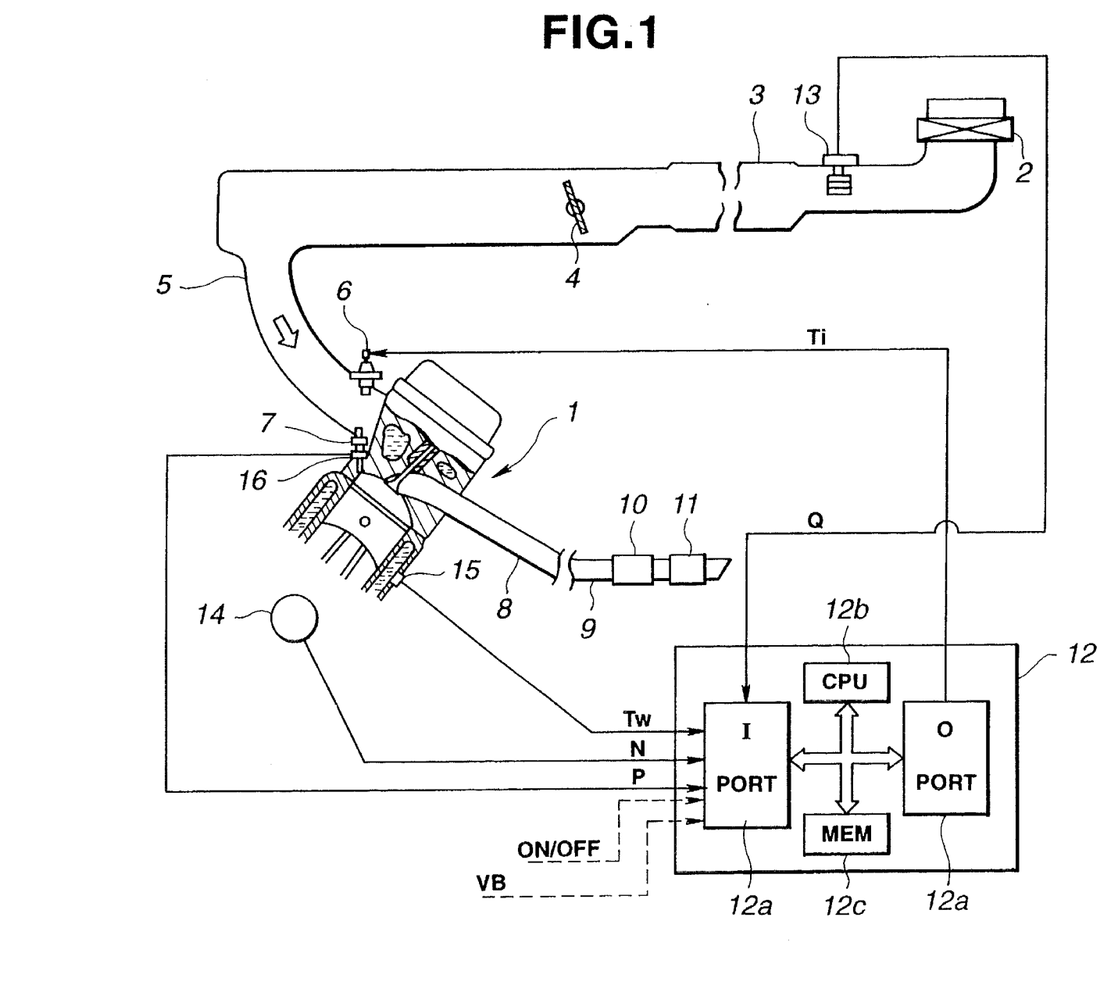
FIG. 1 is a system configuration of an apparatus for determining a characteristic of fuel supplied to a vehicular internal combustion engine in a preferred embodiment according to the present invention.

FIG. 1 shows a system configuration of an apparatus for determining a characteristic of a fuel actually supplied to a vehicular internal combustion engine in a preferred embodiment according to the present invention.

An internal combustion engine 1 includes: an intake air duct 3, a throttle valve 4, and intake manifold 5, through each of which air is sucked into the engine cylinders. A fuel injection valve 6 is installed for each intake air branched passage linked to the corresponding one of the cylinders. Each fuel injection valve 6 is an electromagnetic switching valve which is open to inject fuel during a drive signal supplied to a electromagnetic coil portion thereof and which is closed to interrupt the fuel injection therefrom during no drive signal supplied to the coil portion. The drive signal is a pulse signal derived from a control unit 12 as will be described later in synchronization with an engine revolution. Then, each fuel injection valve 6 injects a fuel pressurized under a predetermined constant pressure by means of a pressure regulator and derived from a fuel pump (not shown).

A combustion chamber of each cylinder of the engine 1 is provided with an ignition plug 7, the ignition plug 7 igniting and burning an air-fuel mixture within the corresponding one of the combustion chambers through its spark discharge. An exhaust gas after an explosion of the air-mixture fuel is exhausted to the air through an exhaust manifold 8, an exhaust duct 9, a catalytic converter 10, and a muffler 11.

The control unit 12 is provided with a microcomputer including : a CPU 12b (Central Processing Unit) 12a; a MEM 12c (Memory) having a ROM (Read Only Memory) and a RAM (Random Access Memory); an I/O port 12a having an A/D converter; and a common bus. The control unit 12 receives signals derived from various sensors, performs an arithmetic operation as will be described later, and outputs the drive signals so as to control operations of the respective fuel injection valves 6.

An airflow meter 13 is disposed within the intake duct 3 and outputs a signal corresponding to an intake air quantity Q of the engine 1 to the control unit 12. In addition, a crank angle sensor 14 is installed, for example, on and adjacent to an engine crankshaft so as to output a reference crank angle signal REF whenever the engine crankshaft has rotated through a reference angular position (in a case of a four-cylinder engine, 180°) and output a unit angular signal POS for each 1° or 2° angular displacement of the engine crankshaft.

It is noted that an engine revolution speed N is calculated in the control unit 12 according to a measurement of a number of generated number of pulses constituting the unit angular signal POS within a predetermined period of time or according to a length of period of the received reference signal REF.

An engine coolant temperature sensor 15 is disposed within a water jacket of the engine 1 so as to detect an engine coolant temperature Tw and output an engine coolant temperature indicative signal to the control unit 12.

A washer attached on each ignition plug 7 so as to fasten the plug 7 to the engine 1 is constituted by a piezoelectric type inner cylinder pressure responsive sensor 16 and outputs a signal whose level is in accordance with an inner cylinder pressure P of the corresponding one of the combustion chambers. Such a washer, piezoelectric type inner cylinder pressure responsive sensor 16 is exemplified by a U.S. Pat. No. 4,660,535 issued on Apr. 28, 1987 (, the disclosure of which is herein incorporated by reference).

Furthermore, the control unit 12 receives On or Off signals derived from an ignition switch portion (start switch) and from accessories of the engine which serve as engine loads such as a switch of an air conditioner (ai-conditioner compressor), and/or a switch related to a power-assisted steering mechanism.

The CPU 12b constituting the microcomputer built in the control unit 12 arithmetically operates for parameters determining a fuel injection quantity Ti in accordance with a program stored in the memory (MEM 12c) of the ROM, calculates the fuel injection quantity Ti, and outputs the drive pulse signal having a pulsewidth corresponding to Ti at a predetermined timing synchronized with the engine revolution to the corresponding one of the fuel injection valves 6.

The fuel injection quantity of Ti is calculated as Ti=(basic fuel injection quantity) Tp×various correction coefficients (COEF).

The basic fuel injection quantity Tp is calculated as Tp=K×Q/N (wherein, K denotes a constant) on the basis of the intake air quantity Q and engine revolution speed N.

The various correction coefficients COEF are calculated as COEF=1+ (an engine coolant temperature related fuel incremental quantity correction coefficient) $K_{TW}$+ (post-engine-start time related fuel incremental correction coefficient) $K_{AS}$+ (an engine acceleration time related fuel incremental quantity correction coefficient) $K_{ACC}$+. . . .

The engine coolant temperature incremental quantity correction coefficient $K_{TW}$ is added to increment the fuel injection quantity as the engine coolant temperature $T_{TW}$ becomes lower. In addition, the post-engine-start time related fuel increment quantity correction coefficient $K_{AS}$ is added to increment the fuel injection quantity as the engine coolant temperature $T_W$ at a time immediately after the engine has started is lower and is such that as the time passes, the fuel injection quantity is gradually decreased at a predetermined gradient and the value of the $K_{AS}$ is finally reached to zero. Furthermore, the acceleration time related incremental quantity correction coefficient $K_{ACC}$ is added to increment the fuel injection quantity so that an abrupt variation in the air-fuel mixture ratio during an engine acceleration is avoided.

A correction demand of the fuel injection quantity by means of the various correction coefficients COEF is varied according to a characteristic of the fuel supplied to the engine 1, particularly, a heavier gravity or lighter gravity (vaporizability or vaporization percentage) of the fuel used in the engine 1. When the heavier gravity fuel is used having a low vaporization percentage, the fuel injection quantity incremental demand by means of the engine coolant temperature incremental quantity correction coefficient $K_{RW}$, post-engine-start time related incremental quantity correction coefficient $K_{AS}$, and acceleration time related incremental quantity correction coefficient $K_{ACC}$ becomes larger than those when the lighter gravity fuel having a high vaporization percentage is used in the engine 1.

Hence, in order to prevent a stability of an engine driving from being deteriorated due to a leaned air-fuel mixture ratio with a magnitude of the actual fuel injection quantity correction being insufficient against the fuel injection incremental demand, initial values of the above-described engine coolant temperature related fuel incremental quantity correction coefficient $K_{TW}$, post-engine-start time related fuel incremental quantity correction coefficient $K_{AS}$, and the acceleration time related fuel incremental quantity correction coefficient $K_{ACC}$ are suited to the heavier gravity fuel which provides a highest demand to increment the fuel injection quantity.

However, if the actual fuel used in the engine combustion is, in turn, light gravity fuel, the fuel injection quantity correction quantity which is corrected by the coefficients becomes excessive so that a worsening of an exhaust characteristic (increment of HC (hydrocarbon) concentration) will be resulted.

Figure 2A:
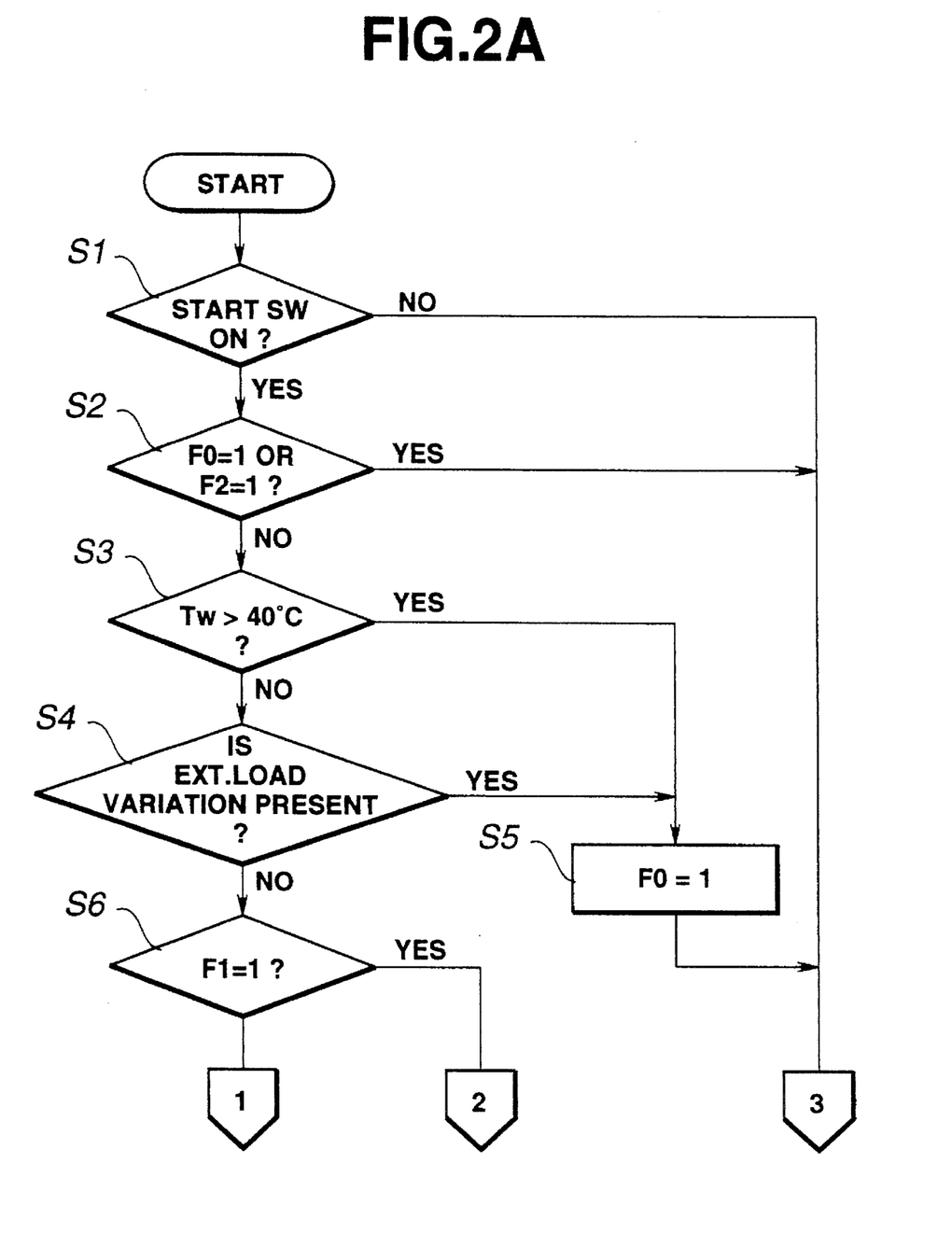
FIGS. 2A and 2B are integrally a flowchart for explaining a determination of fuel characteristic executed in a control unit shown in FIG. 1.
Figure 2B:
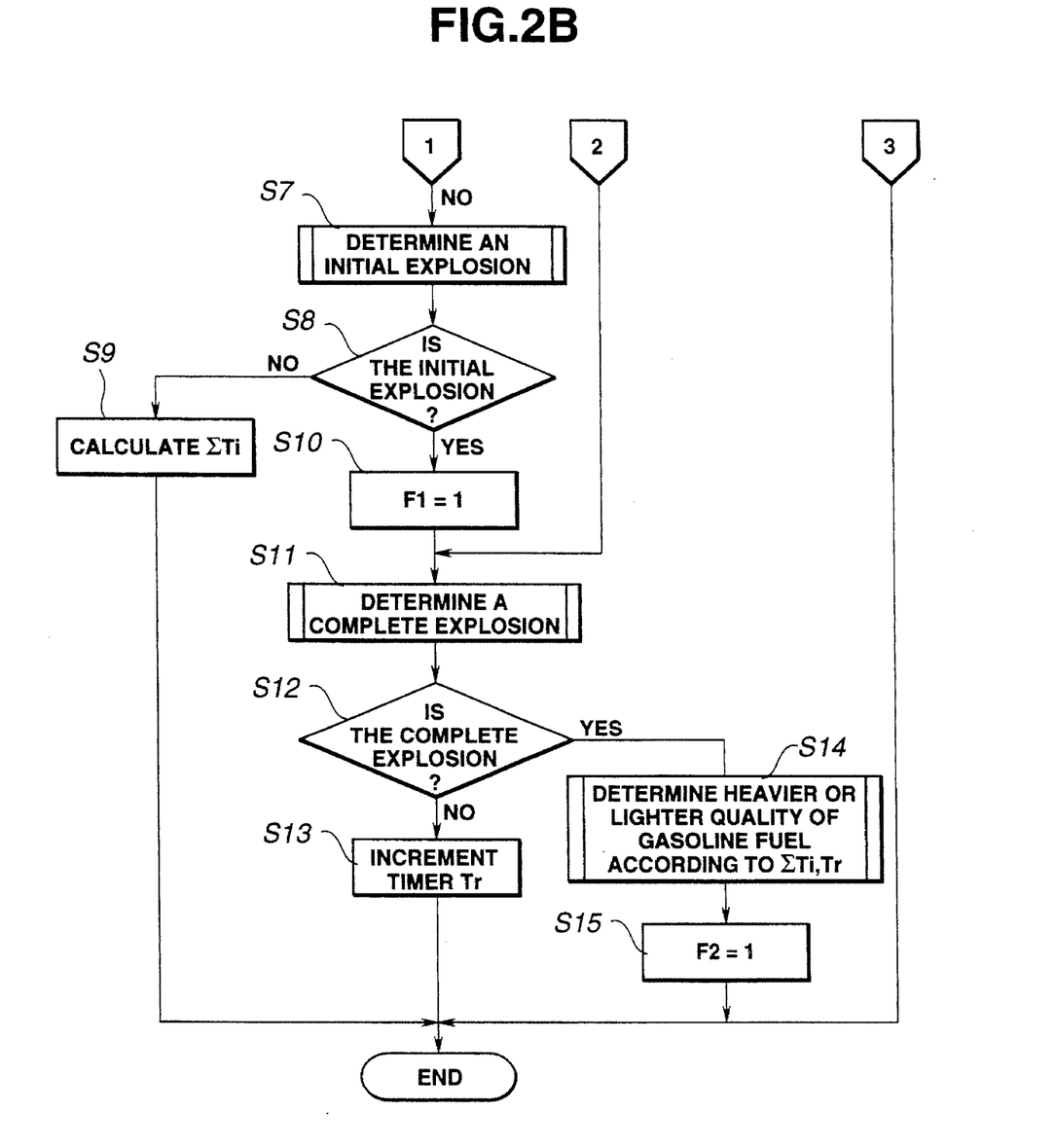

Therefore, an execution of a fuel characteristic determining routine shown in FIGS. 2A and 2B in the control unit 12 permits the determination of the heavy gravity or light gravity of the fuel actually supplied to the engine 1. Then, the values of the engine coolant temperature related fuel incremental quantity correction coefficient $K_{TW}$, post-engine-start time related fuel incremental quantity correction coefficient $K_{AS}$, and the acceleration time related fuel incremental correction coefficient $K_{ACC}$ are corrected to values suited to the actually used fuel in the engine 1 according to a result of the determination shown in FIGS. 2A and 2B. The heavier or lighter gravity of fuel characteristic is exemplified by a U.S. Pat. No. 5,363,314 issued on Nov. 8, 1994 (, the disclosure of which is herein incorporated by reference).

A detailed explanation of the fuel characteristic determination routine shown in FIGS. 2A and 2B will be made hereinafter.

The routine shown in FIGS. 2A and 2B is executed by the microcomputer of the control unit 12 for each predetermined period of time.

It is noted that, in the preferred embodiment, a plurality of flags F0, F1, and F2, an accumulated value of ΣTi, and a value of a timer Tr used in the routine shown in FIGS. 2A and 2B are all cleared to zeros at an initialization to be executed during a turn on of a power supply to the control unit 12.

At a step S1, the CPU 12b determines whether the engine start switch is turned ON according to the ON/OFF signal from the engine start switch.

This is because the fuel characteristic determination is carried out only at a time at which the engine has started. Therefore, if No at the step S1, the routine of the step S1 is ended.

If Yes at the step S1 (it is the time for the engine to start), the routine goes to a step S2.

At a step S2, the CPU 12b determines whether either of a fuel characteristic determination inhibit flag F0=1 or a fuel characteristic determination end flag F2=1. If either of F0=1 or F2=1 (Yes) at the step S2, the routine shown in FIGS. 2A and 2B is ended.

If F0=0 and F2=0 (No) at the step S2, the routine goes to the step S3.

At the step S3, the CPU 12b reads the value $T_W$ of the engine coolant temperature signal from the corresponding sensor 15 and determines whether the value of the engine coolant temperature exceeds a predetermined value (40° in the embodiment). If $T_W$>40° C. at the step S3 (Yes), the routine goes to a step S5 in which the determination inhibit flag F0 is set to 1 (F0=1) and the routine shown in FIGS. 2A and 2B is ended.

This is because when the engine has started with the excessively high engine temperature, a difference in a percentage in vaporization of the fuel used in the engine 1 does not clearly appear and, therefor, an erroneous determination of the fuel characteristic is avoided.

Then, if $T_W$≦40° C. at the step S3, the routine goes to a step S4.

At the step S4, the CPU 12b determines whether a variation in an accessory load (external load) of the engine such as an air conditioner or power assisted steering mechanism occurs (, i.e., a switching between its ON state and OFF state occurs). If the variation described above occurs (Yes) at the step S4, the routine goes to the step S5 in which the flag F0=1 and the routine shown in FIGS. 2A and 2B is ended.

This is because when the variation in the engine load described above occurs, this variation provides an external disturbance so as to worsen a determination accuracy of the fuel characteristic.

If no external load variation occurs (No) at the step S4, the routine goes to a step S6.

At the step S6, the CPU 12b determines whether an initial explosion determination end flag F1 is set to 1 (F1=1). If No (F1=0) at the step S6, the routine goes to a step S7.

At the step S7, the CPU 12b determines an occurrence of the initial explosion, i.e, a start of an explosion of the fuel supplied to any one of the engine combustion chambers in its explosion stroke has occurred. Then, at the next step S8, the CPU 12b determines whether the occurrence of the initial explosion is detected.

Specific examples of the initial explosion determination will be described below.

Figures 3A, 3B, 3C:
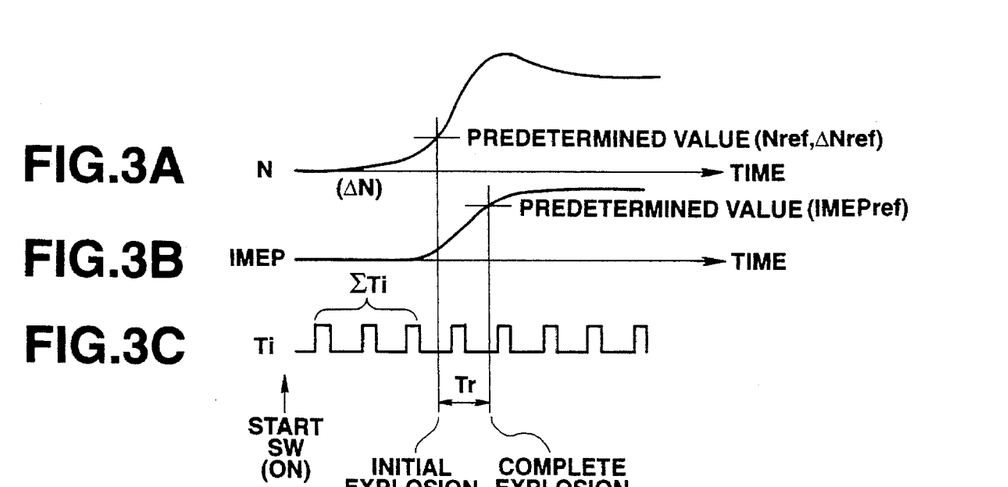
FIGS. 3A, 3B, and 3C are timing charts for explaining operations of the engine and fuel characteristic determination parameters during an engine start in the apparatus shown in FIG. 1.

As shown in FIGS. 3A, 3B, and 3C, when an absolute value of the engine revolution speed N is compared with a predetermined revolution speed value $N_{ref}$ and the absolute value thereof has exceeded the predetermined engine revolution speed value, the CPU 12b determines that the initial explosion has occurred. Alternatively, when the CPU 12b calculates a variation ΔN of the engine revolution speed N and the CPU 12b has exceeded a predetermined variation value ($\Delta N_{ref}$), the CPU 12b determines that the initial explosion has occurred.

It is noted that until the initial explosion determination is carried out at the steps S7 and S8, the routine goes to a step S9 in which the accumulated value ΣTi is updated (refer to FIG. 3C) to calculate a fuel supply quantity to the engine 1 from the time at which the engine start switch has been turned ON up to the time at which the initial explosion has occurred, the accumulated value ΣTi being an accumulated value of the fuel injection quantities Ti continually supplied to the engine 1 from the respective fuel injection valves 6. The updating of ΣTi at the step S9 is continued until the CPU 12b determines that the initial explosion has occurred at the steps S7 and S8.

If Yes at the step S8, the routine goes to a step S10 in which the initial explosion determination end flag F1 is set to 1 (F1=1). Then, the routine goes to a step S11. The accumulated value of ΣTi at this time indicates the fuel injection quantity Ti which has been supplied to the engine 1 until the occurrence of the initial explosion. It is noted that after the flag F1 has been set to 1 at the step S10, at the subsequent executions of the routine shown in FIGS. 2A and 2b, a jump from the step S6 to the step S11 is carried out.

At the step S11, the CPU 12b determines an occurrence in completion of the explosion in the corresponding one of the combustion chambers. At the next step S12, the CPU 12b determines whether the completion of the explosion has been determined.

A Specific example of the determination of occurrence in the completion of the explosion will be described below.

That is to say, the inner cylinder pressure value P detected by the inner cylinder pressure responsive sensor 16 is integrated with respect to a predetermined crank angular interval in the explosion stroke of the corresponding one of the cylinders so as to derive an indicated average effective pressure IMEP and the derived indicated average effective pressure IMEP is compared with a predetermined value $IMEP_{ref}$ as shown in FIG. 3B. Then, when the derived indicated effective value IMEP has exceeded the predetermined value $IMEP_{ref}$, the CPU 12b determines that the completion of the explosion has occurred.

It is noted that until the completion of the explosion is determined the routine goes to a step S13 in which an increment of the value of the timer Tr is continued to measure a time duration which has been required from the time at which the initial explosion has occurred to the time at which the completion of the explosion has occurred.

Then, if the CPU 12b determines that the completion of the explosion has occurred at the steps S11 and S12, the routine goes to a step S14. The value of the timer Tr at this time indicates the time duration from the time of the occurrence of the initial explosion to the time of the occurrence of the completion of the explosion.

Figure 4:
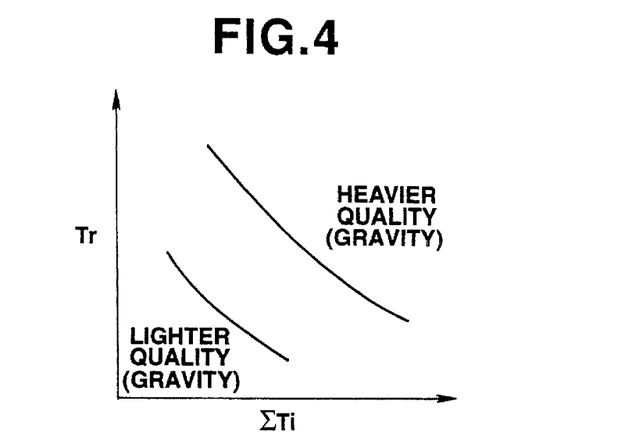
FIG. 4 is a table map indicating the determination of the fuel characteristic in the case of the preferred embodiment shown in FIG. 1.

At the step S14, the CPU refers to a map shown in FIG. 4 previously stored using the table look-up technique according to the accumulated value of ΣTi and the measured time duration value of the timer Tr so as to determine a degree of a heavier or lighter gravity of the fuel used in the engine 1.

At the step S14, the CPU 12b determines the characteristic of the fuel used in the engine 1 as follows.

When the total fuel supply quantity denoted by ΣTi until the occurrence in the initial explosion is relatively large and the time duration measured from the time of occurrence in the initial explosion to the time of occurrence in the completion of the explosion by the timer Tr is relatively long, the CPU 12b determines that the heavier gravity of fuel is used. When the total fuel supply quantity denoted by ΣTi until the occurrence in the initial explosion is relatively small and the time duration measured by the timer Tr is relatively short, as shown in FIG. 4, the CPU 12b determines that the lighter gravity fuel is used.

This is because in a case where the fuel used in the engine 1 is the heavier gravity fuel (the percentage of the vaporization is low), a rate of the fuel at which the supplied fuel is adhered or adsorbed onto walls of the intake air port and intake valves of the engine 1 (a rate of adhesion) becomes higher so that the fuel supply quantity ΣTi until the occurrence of the initial explosion becomes large and the time duration Tr measured from the time at which the initial occurrent in the explosion (initial explosion) to the time at which the completion of the explosion occurs becomes long and, on the contrary, in a case where the fuel used in the engine 1 is the lighter gravity fuel (the percentage of the vaporization is high), the rate described above becomes less and the time duration Tr measured from the time at which the initial explosion occurs to the time at which the completion of the explosion occurs becomes shorter.

After the determination of the fuel characteristic at the step S14, the routine goes to a step S15 in which the fuel characteristic determination end flag F2 is set to 1 (F2=1).

As described above, it is possible to determine the characteristic of the fuel used in the engine 1 according to the routine shown in FIGS. 2A and 2B.

Next, according to the result of the determination of the fuel characteristic during the lo engine start, another routine set in the control unit 12 is executed so that the engine coolant temperature related fuel incremental quantity correction coefficient $K_{TW}$, the post-engine-start time related fuel incremental quantity correction coefficient $K_{AS}$, and acceleration-time related fuel incremental quantity correction coefficient $K_{ACC}$ are suited to the respective values to the fuel actually used in the engine 1.

In details, the initial values of the above-described correction coefficients such as $K_{TW}$, $K_{AS}$, and $K_{ACC}$ (the initial values are set to the values suited to the heavier gravity fuel) are corrected to the heavier or lighter gravity fuel actually used in the engine 1 so that the incremental quantity corrections of fuel required according to the fuel used in the engine 1 at minimum are executed. Such an earlier correction of the fuel incremental quantity correction coefficients as described above permits an increased improvement in the exhaust gas characteristic.

It is noted that the data on the fuel characteristic (heavier gravity fuel or lighter gravity fuel) determined at the step S14 may be vanished (disappear, volatile) when a vehicular ignition switch is turned OFF so as to stop the engine. Alternatively, the data described above may be held and stored in the memory of the control unit 12 according to a back-up power supply other than the vehicular battery. Then, in a case where the fuel supply through a fuel inlet of the vehicle is not carried out during the stop of the engine, the control unit 12 may deem that no change in the fuel characteristic occurs and may consecutively use the fuel characteristic data determined at a previous engine driving time without change.

As described above, in the preferred embodiment, the determination of the occurrence in the initial explosion is based on the engine revolution speed N (or ΔN).

Alternatively, the control unit 12 may compare an absolute value of the intake air quantity Q derived from the airflow meter 13 with a predetermined value $Q_{ref}$ and may determine the occurrence in the initial explosion when the absolute value of intake air quantity has exceeded the predetermined value $Q_{ref}$. Furthermore, the control unit 12 may calculate a variation ΔQ of the intake air quantity Q derived from the airflow meter 13, may compare the variation ΔQ with a predetermined variation value $ΔQ_{ref}$, may determine the occurrence in the initial explosion when the variation of ΔQ has exceeded the predetermined variation value $ΔQ_{ref}$.

In addition, a negative pressure sensor may be disposed in the intake air passage of the engine so as to detect an intake air negative pressure sensor B, an absolute value of the intake air negative pressure B may be compared with a predetermined value $B_{ref}$, and the control unit 12 may determine the occurrence of the initial explosion when the absolute value of the intake air negative pressure B has exceeded the predetermined value $B_{ref}$. Alternatively, the control unit 12 may calculate a variation ΔB in the intake air negative pressure B, may compare the variation ΔB with a predetermined value B, and may determine the occurrence in the initial explosion when the variation ΔB has exceeded the predetermined value B.

Alternatively, the control unit 12 may determine a variation ΔVB of the vehicular battery voltage VB, compare the variation ΔVB with a lo predetermined variation $ΔVB_{ref}$, and may determine the occurrence of the initial explosion when the variation ΔVB has exceeded the predetermined value $ΔVB_{ref}$ due to an increase in a charged quantity in the vehicular battery caused by an increase in the engine revolutions.

Next, as described above, the completion of the explosion is determined on the basis of the indicated average effective pressure IMEP, in the preferred embodiment.

Alternatively, the control unit 12 may determine a stability factor (variation quantity) of an engine driving parameter such as the engine revolution speed N, intake air quantity Q, or intake air negative pressure B and may determine the occurrence in the completion of the explosion when the determined stability factor has exceeded a predetermined criterion and, thereafter, the engine becomes stable.

Various types of embodiments and modifications can be made within the scope of the present invention which will be defined by the appended claims.

What is claimed is:

1. An apparatus for determining a fuel characteristic supplied to a vehicular internal combustion engine, comprising:

a) first determining means for determining whether it is a time for the engine to start;

b) initial explosion determining means for determining whether an initial explosion of the fuel supplied to any one of engine cylinders occurs;

c) complete explosion determining means for determining whether a complete explosion of the fuel supplied to any one of the engine cylinder occurs;

d) fuel supply quantity calculating means for calculating a fuel supply quantity during a time duration from a time at which the first determining means determines that it is the time for the engine to start to a time at which the initial explosion determining means determines that the initial explosion occurs; and e) time measuring means for measuring a time duration from a time at which the initial explosion determining means determines that the initial explosion has occurred to a time at which the complete explosion determining means determines that the complete explosion has occurred; and f) second determining means for determining the fuel characteristic supplied to the engine on the basis of both of the calculated fuel quantity by means of the fuel supply quantity calculating means and the time duration measured by said time measuring means.

2. An apparatus for determining a fuel characteristic supplied to a vehicular combustion engine as claimed in claim 1, wherein said second determining means determines that the fuel supplied to the engine has a heavier gravity characteristic when the fuel supply quantity calculated by said fuel supply calculating means is relatively large and the time duration measured by the time duration measuring means is relatively long.

3. An apparatus for determining a fuel characteristic supplied to a vehicular internal combustion engine as claimed in claim 2, which further comprises engine revolution determining means for determining an engine revolution speed and outputting a signal indicative of the engine revolution speed and wherein said initial explosion determining means determines the initial explosion on the basis of the engine revolution speed signal.

4. An apparatus for determining a fuel characteristic supplied to a vehicular internal combustion engine as claimed in claim 3, which further comprises engine revolution speed variation determining means for determining whether a variation in the engine revolution speed signal which exceeds a predetermined value occurs and wherein the initial explosion determining means determines that the initial explosion has occurred when the engine revolution variation determining means has determined that the variation in the engine revolution speed which exceeds the predetermined value has occurred.

5. An apparatus for determining a fuel characteristic supplied to a vehicular internal combustion engine as claimed in claim 4, wherein the predetermined value exceeds 1.

6. An apparatus for determining a fuel characteristic supplied to a vehicular internal combustion engine as claimed in claim 3, which further comprises engine revolution speed variation determining means for determining whether an absolute value of the engine revolution speed exceeds another predetermined value and wherein said initial explosion determining means determines the initial explosion when the absolute value of the engine revolution speed exceeds the predetermined value.

7. An apparatus for determining a fuel characteristic supplied to a vehicular internal combustion engine as claimed in claim 1, which further comprises pressure determining means for determining an indicated average effective pressure and wherein said complete explosion determining means determines that the complete explosion has occurred on the basis of a value of the indicative average effective pressure.

8. An apparatus for determining a fuel characteristic supplied to a vehicular internal combustion engine as claimed in claim 7, which further comprises first inhibiting means for determining an engine coolant temperature during the engine start determined by the first determining means, determining whether the determined engine coolant temperature exceeds and rises to a predetermined temperature and wherein said second determining means is inhibited from the determination of the fuel characteristic when said first inhibiting means determines that the determined engine coolant temperature exceeds and rises to the predetermined temperature.

9. An apparatus for determining a fuel characteristic supplied to a vehicular internal combustion engine as claimed in claim 1, which further comprises first inhibiting means for determining an engine coolant temperature during the engine start determined by the first determining means, determining whether the determined engine coolant temperature exceeds and rises to a predetermined temperature and wherein said second determining means is inhibited from the determination of the fuel characteristic when said first inhibiting means determines that the determined engine coolant temperature exceeds and rises to the predetermined temperature.

10. An apparatus for determining a fuel characteristic supplied to a vehicular internal combustion engine as claimed in claim 9, which further comprises second inhibiting means for determining a variation in an engine accessory load during the engine start determined by the first determining means has occurred and for inhibiting the determination of the fuel characteristic by said second determining means when the variation in the engine accessory load has occurred.

11. An apparatus for determining a fuel characteristic supplied to a vehicular internal combustion engine as claimed in claim 1, which further comprises inhibiting means for determining a variation in an engine accessory load during the engine start determined by the first determining means has occurred and for inhibiting the determination of the fuel characteristic by said second determining means when the variation in the engine accessory load has occurred.

12. An apparatus for determining a fuel characteristic supplied to a vehicular internal combustion engine as claimed in claim 1, which further comprises intake airflow quantity determining means for determining an intake airflow quantity supplied to the engine and wherein the initial explosion determining means determines the occurrence in the initial explosion on the basis of the determined intake airflow quantity.

13. An apparatus for determining a fuel characteristic supplied to a vehicular internal combustion engine as claimed in claim 1, which further comprises intake air pressure determining means for determining an intake air pressure of the engine and wherein said initial explosion determining means determines the occurrence in the initial explosion on the basis of the determined intake air pressure.

14. An apparatus for determining a fuel characteristic supplied to a vehicular internal combustion engine as claimed in claim 1, which further comprises vehicular battery voltage determining means for determining a variation in a vehicular internal battery voltage and wherein said initial explosion occurrence determining means determines the occurrence of said initial explosion on the basis of the determined vehicular battery voltage variation.

15. An apparatus for determining a fuel characteristic supplied to a vehicular internal combustion engine as claimed in claim 1, which further comprises fuel injection quantity control means for controlling a fuel injection quantity on the basis of the determined fuel characteristic.

16. A method for determining a fuel characteristic supplied to a vehicular internal combustion engine, comprising the steps of:

a) determining whether it is a time for the engine to start;

b) determining whether an initial explosion of the fuel supplied to any one of engine cylinders occurs;

c) determining whether a complete explosion of the fuel supplied to any one of the engine cylinder occurs;

d) calculating a fuel supply quantity during a time duration from a time at which the time for the engine to start is determined at the step a) to a time at which the initial explosion occurs at the step b); and e) measuring a time duration from a time at which the occurrence of the initial explosion is determined to a time at which the occurrence of complete explosion is determined; and f) determining the fuel characteristic supplied to the engine on the basis of both of the calculated fuel quantity at the step d) and the time duration measured at the step e).

17. A method for determining a fuel characteristic supplied to a vehicular internal combustion engine as claimed in claim 16, which further comprises the steps of:

g) correcting various fuel incremental quantity correction coefficients according to the determination of the fuel characteristic at said step f); and h) supplying a fuel supply quantity to the engine according to the corrected various fuel incremental quantity correction coefficients at the step g) through fuel injection valves.

* * * * *